United States Patent
Hoog et al.

(10) Patent No.: US 10,123,652 B2
(45) Date of Patent: Nov. 13, 2018

(54) METHOD OF OPERATING A TANKLESS BEVERAGE BREWING APPARATUS

(71) Applicants: Klaus D. Hoog, Oriental, NC (US);
Eric P. Hoog, Oriental, NC (US);
Rodney Queen, Gold Hill, NC (US)

(72) Inventors: Klaus D. Hoog, Oriental, NC (US);
Eric P. Hoog, Oriental, NC (US);
Rodney Queen, Gold Hill, NC (US)

(73) Assignee: Happy Pole, Ltd., Taipei (TW)

(*) Notice: Subject to any disclaimer, the term of this patent is extended or adjusted under 35 U.S.C. 154(b) by 0 days.

(21) Appl. No.: 15/497,859

(22) Filed: Apr. 26, 2017

(65) Prior Publication Data
US 2017/0224152 A1   Aug. 10, 2017

Related U.S. Application Data

(62) Division of application No. 14/185,528, filed on Feb. 20, 2014, now Pat. No. 9,668,610.

(51) Int. Cl.
*A47J 31/54* (2006.01)
*A47J 31/057* (2006.01)
(Continued)

(52) U.S. Cl.
CPC ......... *A47J 31/545* (2013.01); *A47J 31/0576* (2013.01); *A23F 3/18* (2013.01); *A23F 5/26* (2013.01)

(58) Field of Classification Search
CPC ....... A47J 31/545; A47J 31/0576; A23F 3/18; A23F 5/26
See application file for complete search history.

(56) References Cited

U.S. PATENT DOCUMENTS

| 3,711,681 A | 1/1973 | Leuschner et al. |
| 4,141,286 A | 2/1979 | Smit |

(Continued)

FOREIGN PATENT DOCUMENTS

| CN | 202858849 U | 4/2013 |
| EP | 0067932 A1 | 12/1989 |

(Continued)

OTHER PUBLICATIONS waterheaterpro.org—Interested in Tankless Water Heaters? Here's All the Details You Need to Know About Them; Dec. 10, 2013.

*Primary Examiner* — Anthony J Weier
(74) *Attorney, Agent, or Firm* — Ward and Smith, P.A.; Ryan K. Simmons

(57) ABSTRACT

A method of operating a tankless beverage brewing apparatus that includes a digital controller for dynamically varying the water temperature and/or the brew flow rate of the dispensed beverage is shown. In some embodiments, a main supply line of the tankless beverage brewing apparatus includes a pressure reducer, a pressure sensor, a linear heater, a temperature sensor, and a spray valve; all supplying a hot water spray head and/or a hot water spigot. The inlet of the main supply line of the tankless beverage brewing apparatus may be connected directly to the local cold water supply. The controller uses feedback from the temperature sensor and/or the pressure sensor to dynamically vary the water temperature and/or the brew flow rate depending on the type of beverage being brewed.

27 Claims, 8 Drawing Sheets

(51) Int. Cl.
   *A23F 3/18*  (2006.01)
   *A23F 5/26*  (2006.01)

(56) References Cited

U.S. PATENT DOCUMENTS

| | | | |
|---|---|---|---|
| 4,343,988 | A | 8/1982 | Roller et al. |
| 4,757,754 | A | 7/1988 | Welker |
| 4,967,648 | A | 11/1990 | Helbling |
| 5,014,611 | A | 5/1991 | Illy et al. |
| 5,283,854 | A | 2/1994 | Schiebelhuth |
| 5,375,508 | A | 12/1994 | Knepler et al. |
| 5,647,055 | A | 7/1997 | Knepler |
| 5,816,135 | A | 10/1998 | Ferri |
| 6,000,317 | A | 12/1999 | Van Der Meer |
| 6,130,990 | A | 10/2000 | Herrick et al. |
| 6,199,472 | B1 | 3/2001 | Greiwe |
| 6,574,426 | B1 | 6/2003 | Blanco, Jr. |
| 6,600,875 | B2 | 7/2003 | Kodden et al. |
| 7,223,427 | B2 | 5/2007 | Knepler |
| 7,225,728 | B2 | 6/2007 | Lyall, III |
| 7,401,545 | B2 | 7/2008 | Hu et al. |
| 7,523,695 | B2 | 4/2009 | Streeter et al. |
| 7,858,134 | B2 | 12/2010 | Maldanis et al. |
| 7,861,644 | B2 | 1/2011 | Ghassemlou et al. |
| 8,215,229 | B2 | 7/2012 | Faccinti |
| 8,225,708 | B2 | 7/2012 | Lassota et al. |
| 3,498,523 | A1 | 7/2013 | Deivasigamani et al. |
| 9,668,610 | B2 * | 6/2017 | Hoog ............... A47J 31/545 |
| 2008/0148953 | A1 | 6/2008 | Maldanis et al. |
| 2009/0120299 | A1 | 5/2009 | Rahn et al. |
| 2010/0101427 | A1 | 4/2010 | Mulder |
| 2010/0282088 | A1 | 11/2010 | Deuber et al. |
| 2013/0064529 | A1 | 3/2013 | Etter |

FOREIGN PATENT DOCUMENTS

| | | |
|---|---|---|
| WO | 1999040375 A1 | 8/1999 |
| WO | 2012020296 A1 | 2/2012 |

* cited by examiner

METHOD OF OPERATING A TANKLESS BEVERAGE BREWING APPARATUS

RELATED APPLICATION

This application is a divisional of and claims priority to U.S. patent application Ser. No. 14/185,528, entitled "Tankless Beverage Brewing Apparatus," filed on Feb. 20, 2014, now U.S. Pat. No. 9,668,610, the entire disclosure of which is incorporated herein by reference.

TECHNICAL FIELD

The presently disclosed subject matter relates generally to beverage brewing systems and methods and more particularly to a tankless beverage brewing apparatus that includes a digital controller for dynamically varying the temperature and/or flow rate of the dispensed beverage.

BACKGROUND

With the huge popularity of coffee and tea in society, there is a demand for greater variety in these beverages. Some of the more common varieties of coffee include, for example, Colombian, French Roast, Kona, and Costa Rican. Some of the more common tea varieties include, for example, Black, Oolong, Green, and White. The preferred water temperature for coffee varies from about 195° F. to about 205° F., whereas the preferred water temperatures for the various types of tea can vary from about 140° F. for high quality green tea to about 208° F. for black tea.

To accommodate these temperature variations, there are several programmable commercial beverage brewing machines available in the market. To operate these units, the programmable features allow a user to select different water temperatures for different types of beverages. Standard commercial brewers typically consist of a large water tank plumbed into the local water system. Because cold water from the tap is under far too much pressure for brewing beverages, the tank is filled and then the connection to the water system is closed. Then the water in the tank is heated to the programmed temperature by means of a large heating coil mounted inside the tank. When the water reaches the correct temperature a valve is opened allowing water to flow out of the tank from a point approximately one sixth of the distance from the top of the tank. The water then flows from the tank to a spray valve, which wets the coffee or tea. This water is gravity fed and is of a low enough pressure to allow for brewing. After approximately one sixth of the tank has been emptied, the valve is closed, the tank is refilled with cold water, and the cycle repeats until the desired amount of beverage has been brewed.

One disadvantage of this type of system is that the large water tank takes a long time to heat. Therefore, it is kept at either the brewing temperature or a slightly lower standby temperature at all times. This wastes a tremendous amount of energy. Another disadvantage is an inability to quickly change water temperature from one beverage temperature to another. On-demand or instant heaters are known for use in beverage systems. Such on-demand or instant heaters are generally defined as heating assemblies that are able to provide an accurate water temperature without requiring a pre-warming time. Typically, a water tank supplies the heater via a water pump controlled by a controller that also controls the heater. However, most beverage brewers with on-demand or instant heaters, and that are plumbed into local water supplies, still require use of a tank of some kind due to the high water pressure in most local water supply lines. In such beverage systems the tank is required to initially receive the higher pressure water from the local water supply line, and where from there it may be gravity fed to the brewing material, at a much lower pressure.

However, because of the complexity involved in these systems, they are often limited to single cup beverage dispensers. Therefore, new approaches are needed for providing variable water temperature in brewing machines that are capable of brewing large, commercial quantities of beverages.

SUMMARY

In one embodiment, a tankless beverage brewing apparatus is provided. The tankless beverage brewing apparatus may include a controller; a flow path having an inlet at one end connected to a local water supply and one or more outlets at a second end connected to one or more water delivery mechanisms; a spray valve positioned in the flow path; a pressure reducer positioned in the flow path; a heater arranged along a portion of the flow path and thermally coupled thereto such that water in the flow path is heated when the heater is activated; a pressure sensor positioned in the flow path operable to sense a pressure of the water in the flow path; and a temperature sensor positioned in the flow path operable to sense a temperature of the water along the portion of the flow path where the heater is arranged there along; and wherein one or more of the spray valve, heater, pressure sensor, and temperature sensor are electrically connected to the controller. The controller may be operable for dynamically varying at least one of water temperature and flow rate of water through the one or more water delivery mechanisms, by controlling at least one of the spray valve and heater. The controller may dynamically vary one or more of water temperature and flow rate based on feedback from one or more of the temperature sensor and pressure sensor. The heater may include a linear heating element and may be controllable by the controller. The one or more water delivery mechanisms may include at least one of a spray head and a spigot. The one or more water delivery mechanisms may be electrically connected to the controller. The flow path may include an inlet line connected at one end to the local water supply and coupled to an inlet of the pressure reducer at the other end; a main supply line coupled to an outlet of the pressure reducer at one end and coupled to an inlet of the spray valve at the other end; an outlet line coupled to an outlet of the spray valve at one end and coupled to an inlet of the one or more water delivery mechanisms at the other end. The pressure sensor may be positioned in the flow path at a point between the pressure reducer and the one or more delivery mechanisms. The pressure sensor may be positioned in the flow path at a point between the flow path inlet and the pressure reducer. The spray valve is at least one of electrically and manually controlled. The heater comprises a flow through on-demand heater. The apparatus may further include a user interface electrically connected to the controller. The user interface may include at least one of a display and user inputs. The user inputs may include at least one of buttons or a touchscreen. The user via the user interface may at least one of turn the apparatus off and on, select a type of beverage to be brewed, enter a brew temperature, initiate a brewing, suspend a brewing, program the apparatus, and check health and/or status information of the apparatus. The controller may include at least one a standard controller and microprocessor device capable of executing program instructions.

A beverage profiles file may be programmed into the controller, wherein the beverage profiles file may include at least one of brew flow rates and brew temperatures for different types of brew beverages. The apparatus may further include a communications interface connected to the controller. The communications interface may include at least one of a wired communications interface and wireless communications interface. The communications interface may be operable for at least one of local and remote access to the controller, wherein the communications interface may be used to at least one of install software updates into the controller, update beverage profiles file, and monitor the health and/or status of the apparatus. The controller may control the heater using pulse-width modulation (PWM) or other known technique to maintain a desired brew temperature. The controller may control the spray valve to create an intermittent water flow out of the one or more water delivery mechanisms. The controller may dynamically control the spray valve to vary length and number of pulses of water from the one or more water delivery mechanisms during a brewing cycle. The at least one of the flow rate and temperature may be controlled independently for each of the one or more water delivery mechanisms. The flow path may include a branch to form a second flow path connected to a second water delivery mechanism at its second end. The apparatus may further include at least one of a second spray valve, second pressure reducer, second pressure sensor, second temperature sensor, and second heater, wherein the at least one of the second spray valve, second pressure reducer, second pressure sensor, and second temperature sensor may be positioned in the second flow path and the second heater may be positioned along a portion of the second flow path and thermally coupled thereto. The second spray valve, second pressure reducer, second pressure sensor, second temperature sensor, and second heater may be monitored and/or controlled independently and therefore the flow rate and/or water temperature from the second water delivery mechanisms may be dynamically controlled by the controller independently.

In another embodiment a method of operation of a tankless beverage brewing apparatus is provided. The method may include, fluidly connecting the tankless beverage brewing apparatus to a local water supply via an inlet of a fluid path; reducing the water pressure from the local water supply via a pressure reducer positioned in the fluid path; activating the tankless beverage brewing apparatus and initiating a beverage brewing cycle for a desired beverage via a user interface; heating water in the flow path to a desired brew temperature of the desired beverage via a heater controlled by a controller, wherein the controller receives feedback from a temperature sensor connected thereto; controlling water flow rate from the water inlet of the flow path and out of a water delivery mechanism via the controller based on the desired beverage, wherein the controller is electrically connected to a spray valve positioned in the flow path to allow water to flow through the flow path, and wherein the controller is also electrically connected to a pressure sensor positioned in the flow path to adjust flow rate; and deactivating the heater and closing the spray valve at an end of a predetermined brew time of the desired beverage.

BRIEF DESCRIPTION OF THE DRAWINGS

Figure 1:
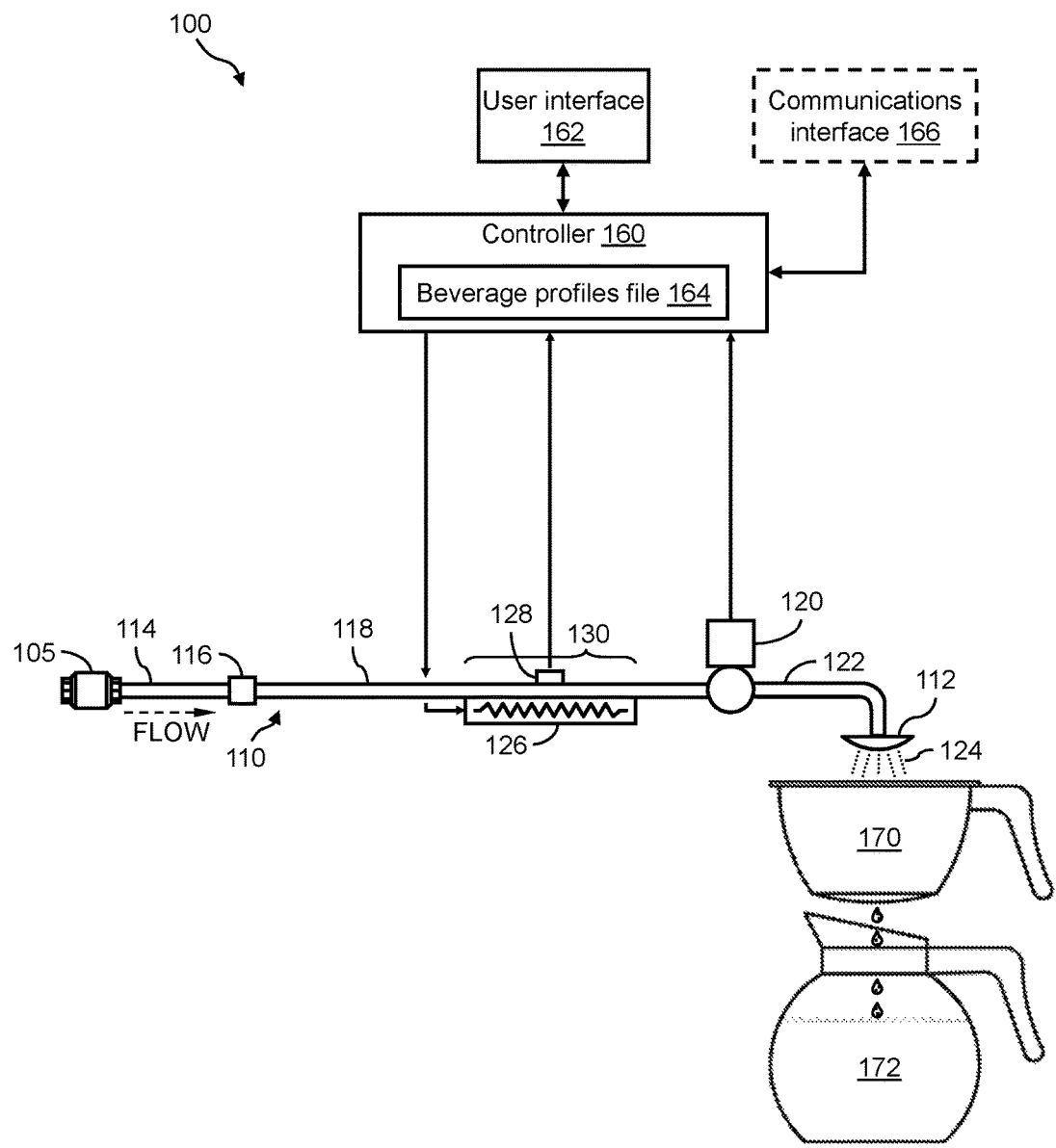
Figure 2:
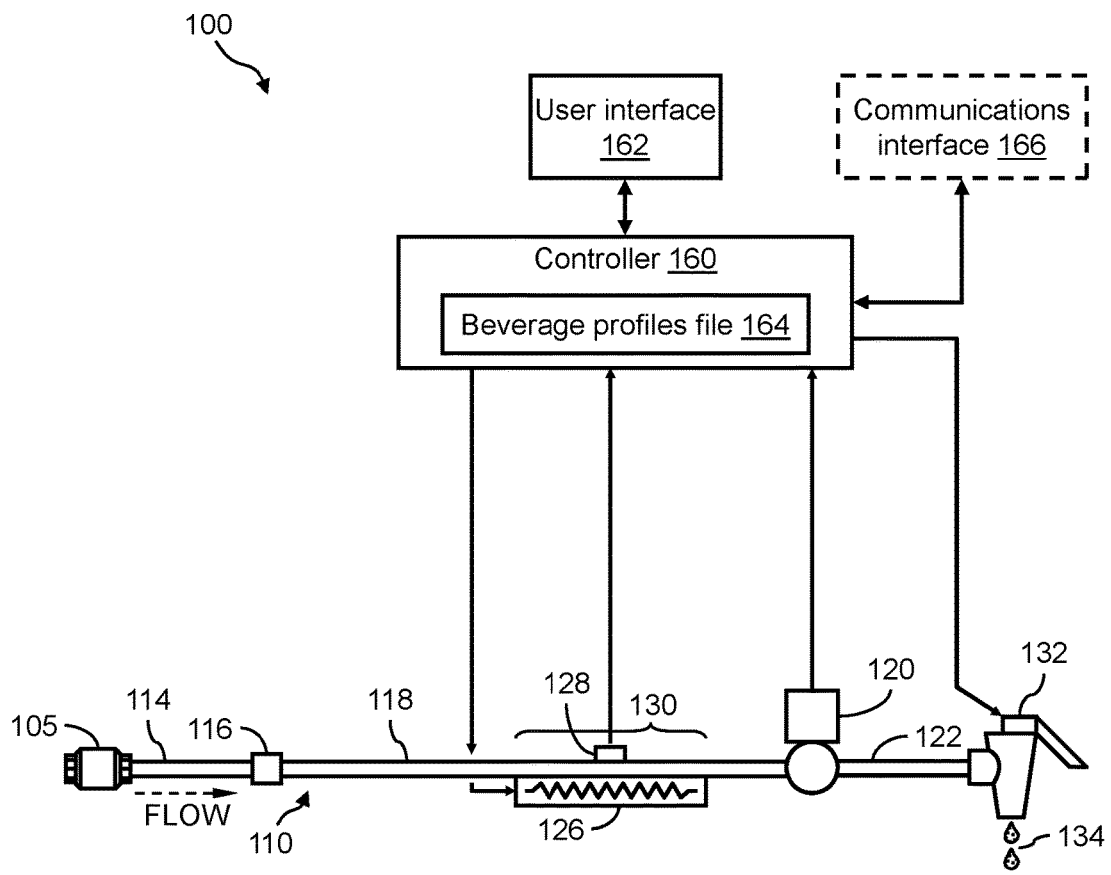
Figure 3:
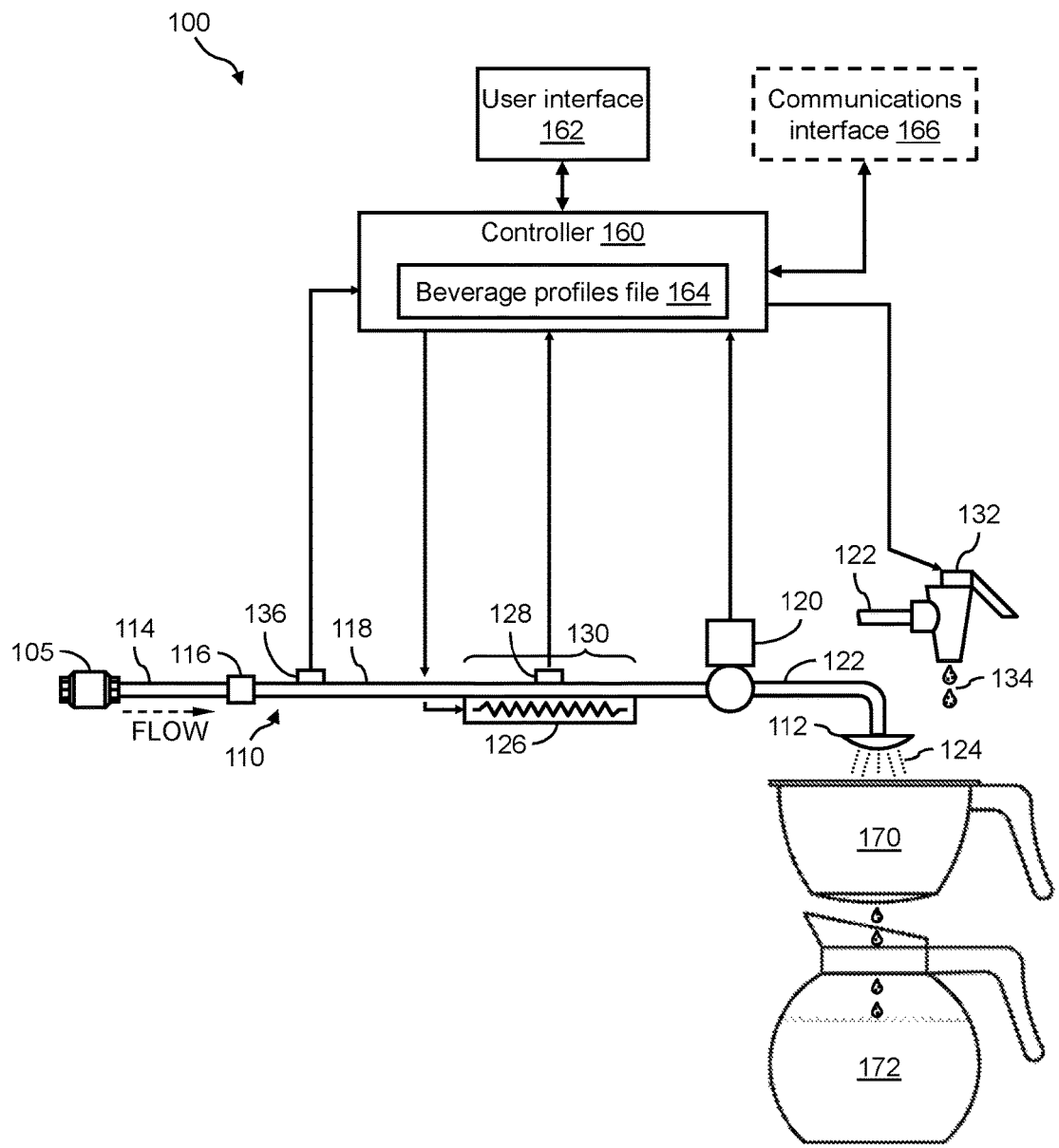
Figure 4:
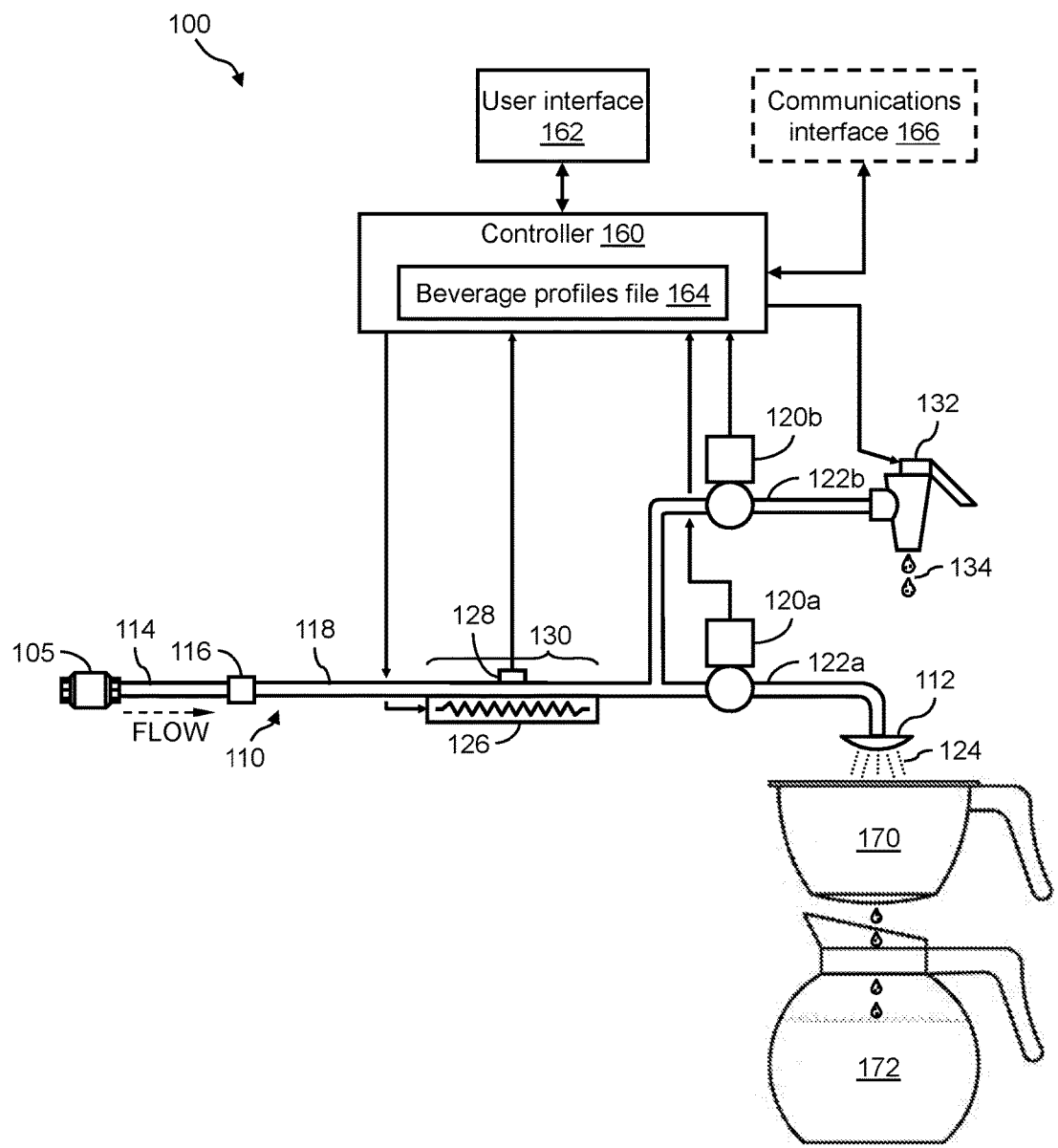
Figure 5:
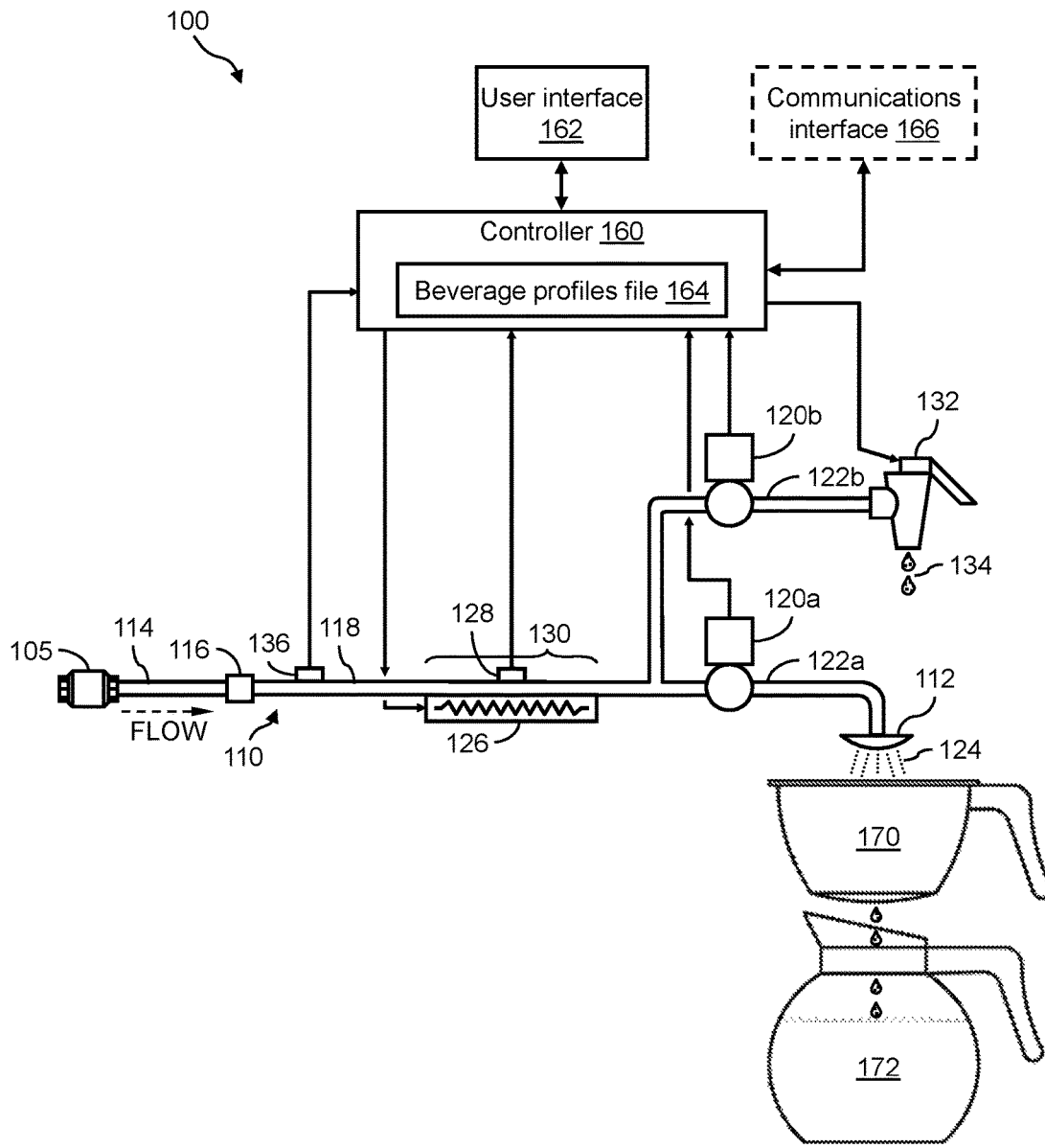
Figure 6:
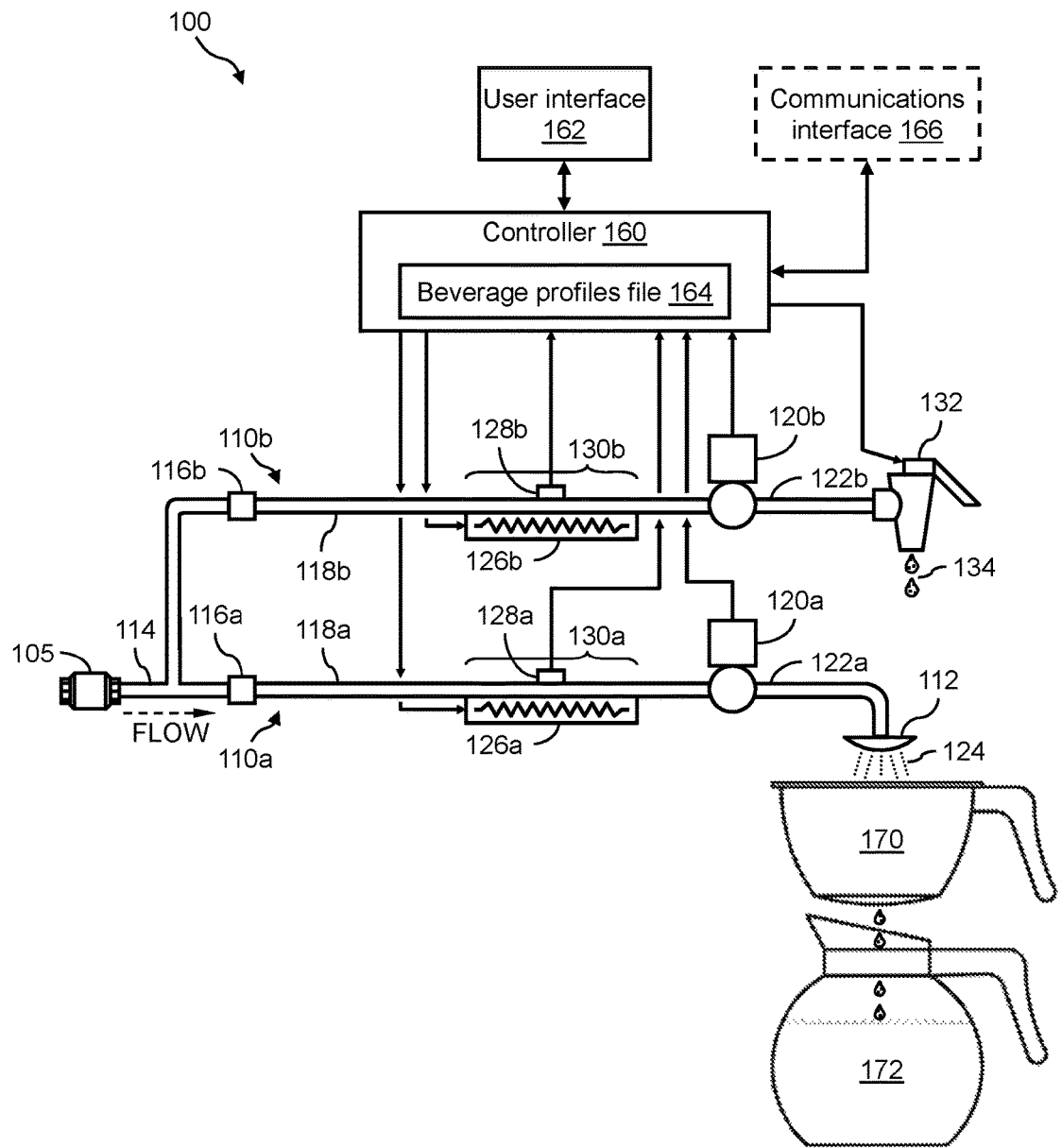
Figure 7:
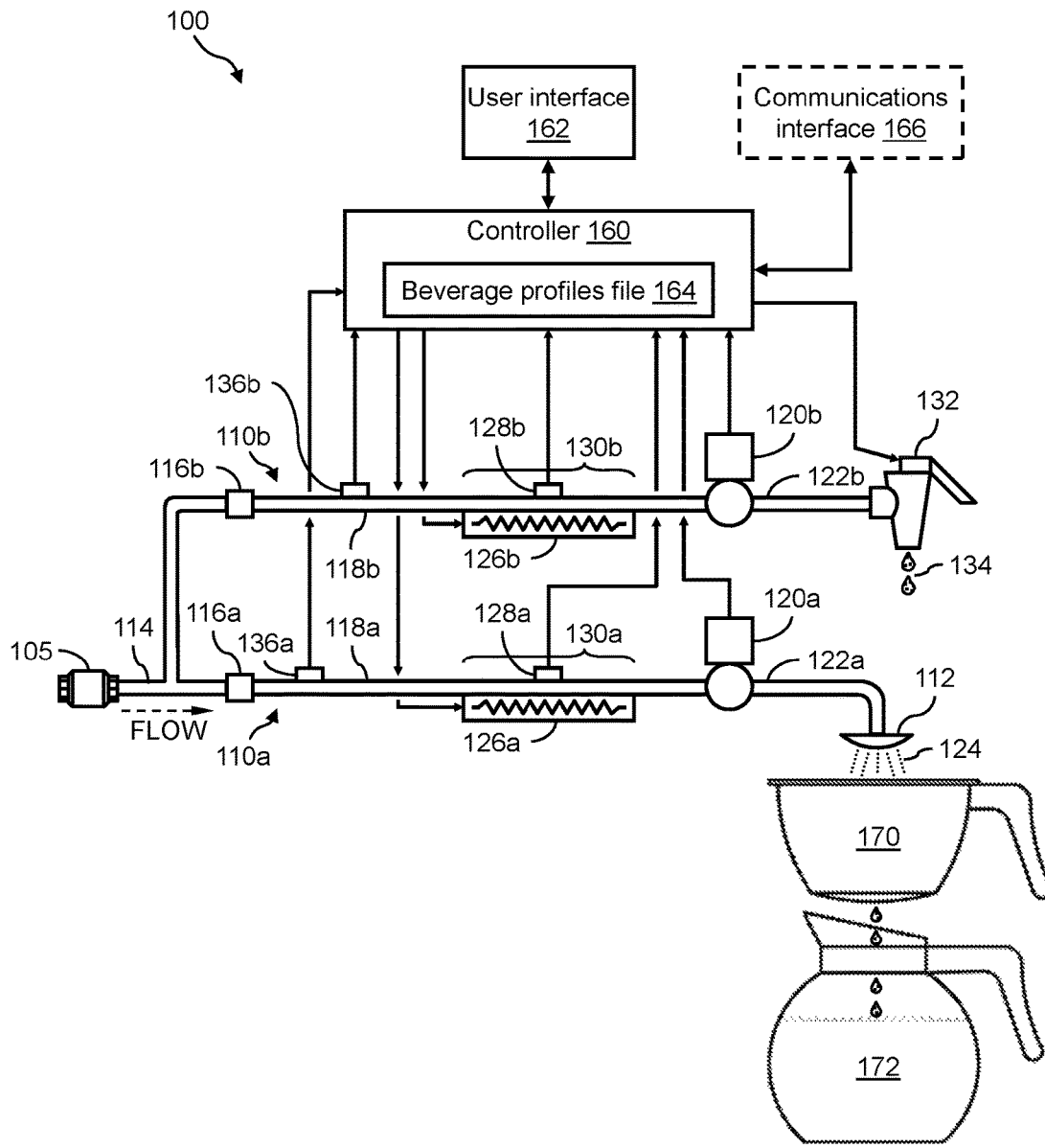
Figure 8:
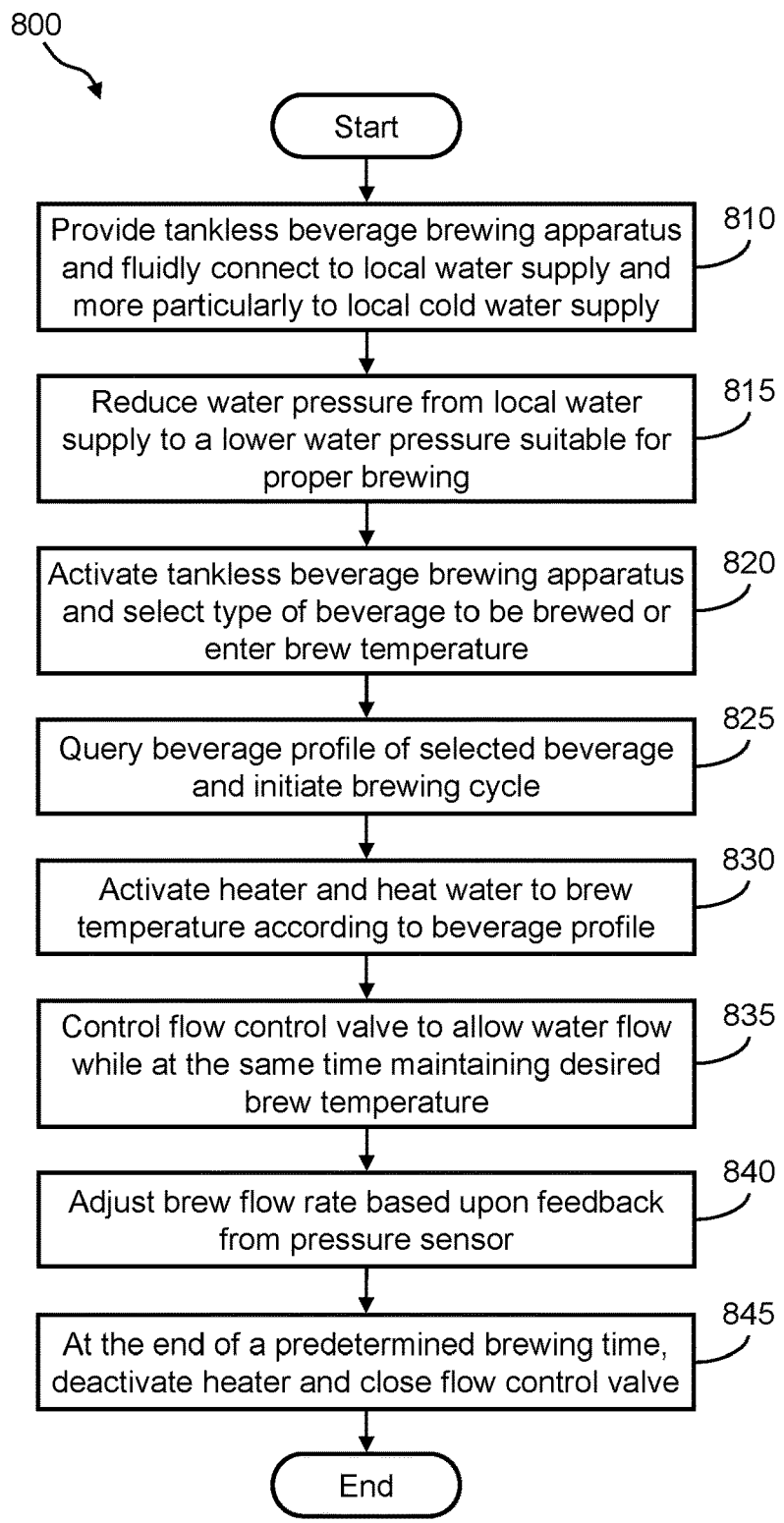

Having thus described the presently disclosed subject matter in general terms, reference will now be made to the accompanying Drawings, which are not necessarily drawn to scale, and wherein:

FIG. 1 illustrates a schematic diagram of an example of a tankless beverage brewing apparatus that includes a digital controller for dynamically varying the water temperature and/or the brew flow rate and wherein the delivery mechanism is a hot water spray head;

FIG. 2 illustrates a schematic diagram of another example of a tankless beverage brewing apparatus that includes a digital controller for dynamically varying the water temperature and/or the brew flow rate and wherein the delivery mechanism is a hot water spigot;

FIG. 3 illustrates a schematic diagram of yet another example of the tankless beverage brewing apparatus of FIG. 1 or FIG. 2 that further comprises a pressure sensor;

FIG. 4 and FIG. 5 illustrate schematic diagrams of yet another example of the tankless beverage brewing apparatus, wherein one flow path supplies both the hot water spray head and the hot water spigot;

FIG. 6 and FIG. 7 illustrate schematic diagrams of still another example of the tankless beverage brewing apparatus, wherein the hot water spray head and the hot water spigot are supplied by separate flow paths that are controlled independently; and FIG. 8 illustrates a flow diagram of an example of a method of operation of the presently disclosed tankless beverage brewing apparatuses.

DETAILED DESCRIPTION

The presently disclosed subject matter now will be described more fully hereinafter with reference to the accompanying Drawings, in which some, but not all embodiments of the presently disclosed subject matter are shown. Like numbers refer to like elements throughout. The presently disclosed subject matter may be embodied in many different forms and should not be construed as limited to the embodiments set forth herein; rather, these embodiments are provided so that this disclosure will satisfy applicable legal requirements. Indeed, many modifications and other embodiments of the presently disclosed subject matter set forth herein will come to mind to one skilled in the art to which the presently disclosed subject matter pertains having the benefit of the teachings presented in the foregoing descriptions and the associated Drawings. Therefore, it is to be understood that the presently disclosed subject matter is not to be limited to the specific embodiments disclosed and that modifications and other embodiments are intended to be included within the scope of the appended claims.

In some embodiments, the presently disclosed subject matter provides a tankless beverage brewing apparatus that includes a digital controller for dynamically varying the water temperature and/or the brew flow rate of the dispensed beverage. The presently disclosed tankless beverage brewing apparatus is capable of brewing large, commercial quantities of beverages as well as single cups of a beverage, and any quantity in between such as a teapot.

An aspect of the presently disclosed tankless beverage brewing apparatus is that it includes a controller for dynamically varying the water temperature and/or flow rate depending on the type of beverage being brewed.

Another aspect of the presently disclosed tankless beverage brewing apparatus is that it is supplied directly from the local water supply, the water pressure reduced, and the water heated using an in-line heater, thereby reducing energy usage as compared with conventional commercial beverage brewing systems that typically rely on large external hot water tanks.

Yet another aspect of the presently disclosed tankless beverage brewing apparatus is that it may include temperature feedback mechanisms based upon which the controller may dynamically control the in-line heater and maintain the selected water temperature.

Still another aspect of the presently disclosed tankless beverage brewing apparatus is that it may include water pressure feedback mechanisms based upon which the controller may dynamically control a spray valve to vary the length and number of pulses during the brewing cycle.

Referring now to FIG. 1 is a schematic diagram of an example of a tankless beverage brewing apparatus 100 that includes a digital controller 160 for dynamically varying the water temperature and/or the brew flow rate of the dispensed beverage and wherein the delivery mechanism is a hot water spray head 112. The tankless beverage brewing apparatus 100 comprises a flow path 110 that supplies hot water spray head 112. Namely, the flow path 110 comprises in order an inlet line 114, a pressure reducer 116, a main supply line 118, a spray valve 120, and an outlet line 122 that supplies the hot water spray head 112.

All components of the flow path 110 are mechanically and fluidly coupled. More particularly, one end of the inlet line 114 is supplied by a local water supply 105 and more particularly the local cold water supply. The local water supply 105 is, for example, the local municipal water supply. The other end of the inlet line 114 is coupled to an inlet of the pressure reducer 116. An outlet of the pressure reducer 116 is coupled to one end of the main supply line 118, while the other end of the main supply line 118 is coupled to an inlet of the spray valve 120. An outlet of the spray valve 120 is coupled to one end of the outlet line 122, while the other end of the outlet line 122 is coupled to an inlet of the hot water spray head 112.

The inlet line 114, the main supply line 118, and the outlet line 122 may be hollow tubing (or hose). The hollow tubing may be formed, for example, of copper, brass, aluminum, stainless steel, plastic, rubber, other suitable material, or any combinations thereof. In particular, the materials forming the main supply line 118 and the outlet line 122 should be suitable to handle the water operating temperatures present in tankless beverage brewing apparatus 100. In one example, the main supply line 118 and the outlet line 122 may be suitable to handle water temperatures up to, for example, in the range of about 210° F.

The inside diameter of the inlet line 114, the main supply line 118, and the outlet line 122 may be in the range of about 10 mm to about 20 mm in one example, or is in the range of about 12 mm in another example. The inlets and/or outlets of the pressure reducer 116, the spray valve 120, and the hot water spray head 112 may be sized according to the inside and outside diameters of the inlet line 114, the main supply line 118, and the outlet line 122.

The pressure reducer 116 may be a standard pressure reducer device that receives water from the local water supply 105 that is at a high pressure and provides water at a lower pressure at its outlet. The pressure of the local water supply 105 may be, for example, in the range of about 20 psi to about 100 psi. Therefore, the pressure reducer 116 may preferably be a pressure reducer that is capable of receiving an input pressure in the range of about 20 psi to about 100 psi and providing an output pressure in the range of about 1 psi to about 2 psi in one example, or in the range of about 5 psi in another example. Accordingly, the pressure reducer 116 may be used to maintain a lower water pressure inside of the main supply line 118 than that inside of inlet line 114 from the local water supply 105.

In other embodiments, a pressure regulator device (not shown) may be provided in place of or in combination with the pressure reducer 116 to ensure a substantially known and constant pressure inside of the main supply line 118.

The spray valve 120 may be a spray valve that may be electrically and/or manually controlled. The hot water spray head 112 may be any spray head or nozzle capable of delivering, for example, a spray mist 124 that is suitable for brewing tea, coffee, cocoa, or other brewing material. Further, the pressure reducer 116, the spray valve 120, and the hot water spray head 112 preferably are capable of handling water temperatures up to, for example, in the range of about 210° F.

The tankless beverage brewing apparatus 100 also may include a heater 126 and a temperature sensor 128. Namely, the heater 126 may be arranged along a portion of the main supply line 118 and thermally coupled to the main supply line 118 such that any water therein may be heated. A heating zone 130 is preferably formed along the main supply line 118 preferably at the location of the heater 126. The temperature of the water that is inside the main supply line 118 may be monitored using the temperature sensor 128 that is located within the heating zone 130. The heater 126 may include, for example, a resistive or other type of linear heating element. In one example, the heater 126 may be a 900-Watt heater that is capable of heating up to in the range of about 210° F. The length of the heater 126 and thus the length of the heating zone 130 may vary and be in the range of about 200 mm to about 300 mm in one example, or in the range of about 250 mm in another example. Heater 126 may be positioned either before or after spray valve 120.

The tankless beverage brewing apparatus 100 may also include a controller 160 and a user interface 162. Further, programmed into the controller 160 may be a beverage profiles file 164. The controller 160 may be any standard controller or microprocessor device that is capable of executing program instructions. The user interface 162 may include, for example, a digital display and push buttons or any other mechanisms by which the user can operate the tankless beverage brewing apparatus 100. In one example, the user interface 162 is used to turn the tankless beverage brewing apparatus 100 off and on. In another example, the user interface 162 is used to select the type of beverage to be brewed, beverage container type and/or size, enter the brew temperature, initiate brewing, suspend brewing, and the like. In yet another example, the user interface 162 is used to display health and/or status information about the tankless beverage brewing apparatus 100.

The beverage profiles file 164 may include, for example, brew flow rates and brew temperatures of different types of beverages. Namely, for each type of beverage, the beverage profiles file 164 may include (1) an upper and lower flow rate set point for the spray valve 120 and (2) an upper and lower temperature set point for the heater 126. In one example, the beverage profiles file 164 may include a "coffee" entry specifying for example a flow rate of 1800 ml/3.5 minutes and a brew temperature of 200° F. In another example, the beverage profiles file 164 may include a "green tea" entry specifying a flow rate, for example, of 1200 ml/6 minutes and a brew temperature of 208° F. In yet another example, the beverage profiles file 164 may include another "tea" entry specifying, for example, a flow rate of 350 ml/2 minutes and a brew temperature of 140° F.

The tankless beverage brewing apparatus 100 may further include a communications interface 166. The communications interface 166 may be any wired and/or wireless communication interface for connecting to a network (not shown) and by which information may be exchanged with other devices (not shown) connected to the network. Examples of wired communication interfaces may include, but are not limited to, USB ports, RS232 connectors, RJ45 connectors, Ethernet, and any combinations thereof. Examples of wireless communication interfaces may include, but are not limited to, an Intranet connection, Internet, ISM, Bluetooth® technology, Wi-Fi, Wi-Max, IEEE 802.11 technology, radio frequency (RF), Infrared Data Association (IrDA) compatible protocols, Local Area Networks (LAN), Wide Area Networks (WAN), Shared Wireless Access Protocol (SWAP), any combinations thereof, and other types of wireless networking protocols.

The communications interface 166 may be used for local or remote access to the tankless beverage brewing apparatus 100. The communications interface 166 may be used, for example, to install software updates into the controller 160, to update beverage profiles file 164, and/or to monitor the health and/or status of the tankless beverage brewing apparatus 100.

When the tankless beverage brewing apparatus 100 is in use, a funnel or basket 170, which may be used for holding coffee grounds, tea leaves, or any other brewing material, and a carafe 172 is preferably positioned at the hot water spray head 112, as shown in FIG. 1.

The controller 160 is used to manage the overall operations of the tankless beverage brewing apparatus 100. Namely, the controller 160 is electrically connected to the spray valve 120, the heater 126, and the temperature sensor 128. Accordingly, the controller 160 is used to control the spray valve 120 to provide a certain brew flow rate for the selected beverage.

Additionally, using feedback from the temperature sensor 128, the controller 160 is used to monitor the temperature of the water within the heating zone 130 and thereby control the heater 126 to provide a certain water temperature for the selected beverage. Accordingly, the tankless beverage brewing apparatus 100 provides a continuous and on-demand tankless water heating system.

Referring now to FIG. 2 is a schematic diagram of an example of a tankless beverage brewing apparatus 100 that includes the digital controller 160 for dynamically varying the water temperature and/or the brew flow rate of the dispensed beverage and wherein the delivery mechanism may be a hot water spigot 132 instead of the hot water spray head 112. In this example, the hot water spigot 132 may be electrically connected to the controller 160. At any time, the user may issue a command from the user interface 162 to open the hot water spigot 132. The controller 160 adjusts the hot water temperature in the heating zone 130 to match the pre-programmed brew temperature and then opens the hot water spigot 132. Likewise, at any time, the user may issue a command from the user interface 162 to close the hot water spigot 132.

In operation and referring now to FIG. 1 and FIG. 2, the user may place a certain amount of a certain type of coffee grounds, tea leaves, or other brewing material in the funnel or basket 170. Then, using the user interface 162, the user selects the type of beverage to be brewed (e.g., the user selects a certain coffee or tea), strength, and/or other brewing parameter, and initiates the brewing cycle. Then, the controller 160 queries the beverage profiles file 164 for the brew flow rate and brew temperature of the selected beverage. Then, the controller 160 controls the spray valve 120 and the heater 126 to provide the brew flow rate and brew temperature for the selected beverage. More particularly, and in one example, the controller 160 may control the heater 126 using pulse-width modulation (PWM) or any other well-known technique to maintain the brew temperature. Further, the controller 160 may control the spray valve 120 to create an intermittent water flow (pulses) out of the hot water spray head 112 to prevent overflowing the funnel or basket 170 and/or for controlling the strength of the brew by pausing the flow of water in a preselected pattern appropriate to the beverage being brewed. Additionally, the controller 160 may coordinate the water flow rate (via the spray valve 120) with the heating rate of the heater 126 to ensure the proper brew temperature. The flow rate and/or the temperature may be controlled one way for the hot water spray head 112 shown in FIG. 1 and controlled another way for the hot water spigot 132 shown in FIG. 2.

Referring now to FIG. 3 is a schematic diagram of yet another example of the tankless beverage brewing apparatus 100 of FIG. 1 or FIG. 2 that may further comprise a pressure sensor 136. Namely, the pressure sensor 136 may be placed anywhere along the main supply line 118. Alternatively, the pressure sensor 136 may be placed anywhere along the inlet line 114. The output of the pressure sensor 136 may be electrically connected to the controller 160, whereby the controller 160 may monitor the pressure of the water inside of the main supply line 118, and/or inlet line 114. Because the pressure of the local water supply 105 may vary, the pressure at the output of the pressure reducer 116 may vary proportionately. In this example, the controller 160 may be used to monitor the water pressure inside of the main supply line 118, and/or inlet line 114, determine the water flow rate, and then calculate the correct amount of water to be released from the hot water spray head 112 or hot water spigot 132. In this embodiment, in addition to using the temperature sensor 128 to dynamically control the brew temperature, the controller 160 may use the pressure sensor 136 to dynamically control the brew flow rate of the tankless beverage brewing apparatus 100. In one example, based upon feedback from the pressure sensor 136, the controller 160 may dynamically control the spray valve 120 to vary the length and number of pulses (of spray mist 124) during the brewing cycle.

Referring now to FIG. 4 and FIG. 5 are schematic diagrams of yet another example of the tankless beverage brewing apparatus 100, wherein the flow path 110 may supply both the hot water spray head 112 and the hot water spigot 132. In this example, the outlet-end of the main supply line 118 may include a branch that supplies two spray valves 120 and two outlet lines 122. For example, one leg of the branch supplies a spray valve 120a, an outlet line 122a, and the hot water spray head 112. The other leg of the branch may supply a spray valve 120b, an outlet line 122b, and the hot water spigot 132. FIG. 4 shows the tankless beverage brewing apparatus 100 without the pressure sensor 136, whereas FIG. 5 shows the tankless beverage brewing apparatus 100 with the pressure sensor 136. In this example, the heater 126 and the heating zone 130 may be common to both the hot water spray head 112 and the hot water spigot 132. However, the spray valves 120a and 120b may be controlled independently by controller 160.

FIG. 6 and FIG. 7 illustrate schematic diagrams of still another example of the tankless beverage brewing apparatus 100, wherein the hot water spray head 112 and the hot water spigot 132 may be supplied by separate flow paths that are controlled independently by controller 160. In this example, the inlet line 114 may include a branch that supplies two flow paths 110; namely, flow paths 110a and 110b.

For example, one leg of the inlet line 114 may supply the flow path 110a that may include a pressure reducer 116a, a main supply line 118a, the spray valve 120a, the outlet line 122a, a heater 126a, a temperature sensor 128a, and a heating zone 130a; all supplying the hot water spray head 112. The other leg of the inlet line 114 may supply the flow path 110b that may include a pressure reducer 116b, a main supply line 118b, a spray valve 120b, an outlet line 122b, a heater 126b, a temperature sensor 128b, and a heating zone 130b; all supplying the hot water spigot 132.

FIG. 6 shows the flow paths 110a and 110b without the pressure sensors, whereas FIG. 7 shows the flow paths 110a and 110b with pressure sensors. For example, FIG. 7 shows a pressure sensor 136a in the main supply line 118a of the flow path 110a as well as a pressure sensor 136b in the main supply line 118b of the flow path 110b.

The spray valve 120a, the heater 126a, the temperature sensor 128a, and the pressure sensor 136a of the flow path 110a may be monitored and/or controlled independently from the spray valve 120b, the heater 126b, the temperature sensor 128b, and the pressure sensor 136b of the flow path 110b to allow simultaneous dispensation of both hot water for brewing (via the hot water spray head 112) and the hot water for the hot water spigot 132. For example, the water temperatures for flow paths 110a and 110b may be different allowing, for example, a pot of coffee to be brewed at one temperature using the hot water spray head 112, while water of a different temperature may be dispensed from the hot water spigot 132 for a cup of tea. At any time, the user may issue a command from the user interface 162 to open the hot water spigot 132. The spray valve 120b and the heater 126b are controlled accordingly. Likewise, at any time, the user may issue a command from the user interface 162 to close the hot water spigot 132.

Referring now to FIG. 8 is a flow diagram of a method 800, which is an example of a method of operation of the presently disclosed tankless beverage brewing apparatus 100. In particular, the method 800 is a method of operation with respect to brewing, for example, a pot of coffee or tea via the hot water spray head 112. The method 800 may include, but is not limited to, the following steps.

At a step 810, the tankless beverage brewing apparatus 100 is provided and the inlet line 114 is fluidly connected to the local water supply 105 and more particularly to the local cold water supply.

At a step 815, using the pressure reducer 116, the water pressure from the local water supply 105, which is, for example, about in the range of about 60 psi, is reduced to a lower water pressure that is suitable for proper brewing. An example of the lower water pressure may be in the range of about 2 psi.

At a step 820, using the user interface 162, the tankless beverage brewing apparatus 100 is activated. Initially, the heater 126 may be off and the spray valve 120 may be closed. Then, the user selects the type of beverage to be brewed and/or enters a desired brew temperature.

At a step 825, based on the selection in the step 820, the controller 160 queries the beverage profiles file 164 and initiates the brewing cycle. For example, the beverage profiles file 164 may indicate the brew flow rate and brew temperature for the selected beverage and the controller 160 initiates the brewing cycle accordingly.

At a step 830, under the control of the controller 160, the heater 126 may be activated and the water heated to the desired brew temperature. For example, the heater 126 may be activated and remains activated until the temperature sensor 128 indicates to the controller 160 that the desired brew temperature is reached.

At a step 835, under the control of the controller 160, the spray valve 120 may be controlled to allow water to flow through the flow path 110 and out of the hot water spray head 112. For example, to avoid overflow, the spray valve 120 may be opened and closed in an alternating fashion to allow the funnel or basket 170 to drain before refilling until the desired quantity of beverage is dispensed. At the same time, the controller 160 preferably monitors the water temperature via the temperature sensor 128 and controls (e.g., using PWM) the heater 126 to maintain the desired brew temperature as the water flows through the flow path 110.

Accordingly, hot water may be dispensed from the hot water spray head 112 at the desired brew flow rate and temperature. In so doing, the coffee grounds, tea leaves, or other brewing material in the funnel or basket 170 is wetted and the brewed beverage flows into the carafe 172.

At a step 840, the brew flow rate may be adjusted based upon feedback from the pressure sensor 136. For example, the controller 160 may monitor the pressure sensor 136 and may adjust the brew flow rate via the spray valve 120 according to the current pressure in the main supply line 118. In one example, based upon feedback from the pressure sensor 136, the controller 160 may dynamically control the spray valve 120 to vary the length and number of pulses (of spray mist 124) during the brewing cycle.

At a step 845, at the end of a predetermined brewing time, the controller 160 may deactivate the heater 126 and closes the spray valve 120.

Further, at any time throughout the steps of the method 800, using the communications interface 166, an external networked device may be used to query the health and/or status of the tankless beverage brewing apparatus 100.

In summary and referring now to FIG. 1 through FIG. 8, the presently disclosed tankless beverage brewing apparatus 100 may be capable of brewing large, commercial quantities of beverages as well as quantities as small as a single cup. Namely, the presently disclosed tankless beverage brewing apparatus 100 may be supplied directly from the local water supply 105, the water pressure reduced via the pressure reducer 116, and the water heated on-demand using the heater 126, thereby reducing energy usage as compared with conventional commercial beverage brewing systems that rely on large internal hot water tanks. Further, the controller 160 of the presently disclosed tankless beverage brewing apparatus 100 may use feedback from the temperature sensor 128 and/or the pressure sensor 136 to dynamically vary the water temperature and/or the brew flow rate depending on the type of beverage being brewed.

Following long-standing patent law convention, the terms "a," "an," and "the" refer to "one or more" when used in this application, including the claims. Thus, for example, reference to "a subject" includes a plurality of subjects, unless the context clearly is to the contrary (e.g., a plurality of subjects), and so forth.

Throughout this specification and the claims, the terms "comprise," "comprises," and "comprising" are used in a non-exclusive sense, except where the context requires otherwise. Likewise, the term "include" and its grammatical variants are intended to be non-limiting, such that recitation of items in a list is not to the exclusion of other like items that can be substituted or added to the listed items.

For the purposes of this specification and appended claims, unless otherwise indicated, all numbers expressing amounts, sizes, dimensions, proportions, shapes, formulations, parameters, percentages, parameters, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the presently disclosed subject matter. For example, the term "about," when referring to a value can be meant to encompass variations of, in some embodiments, ±100% in some embodiments ±50%, in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

Although the foregoing subject matter has been described in some detail by way of illustration and example for purposes of clarity of understanding, it will be understood by those skilled in the art that certain changes and modifications can be practiced within the scope of the appended claims.

That which is claimed:

1. A method of operation of a tankless beverage brewing apparatus, the method comprising:
   a. providing a tankless beverage brewing apparatus, comprising:
      i. a controller;
      ii. a flow path having an inlet at one end connected to a local water supply and one or more outlets at a second end connected to one or more water delivery mechanisms;
      iii. a spray valve positioned in the flow path;
      iv. a pressure reducer positioned in the flow path;
      v. a heater arranged along a portion of the flow path and thermally coupled thereto, wherein when activated, the heater is configured to heat the water to a desired brew temperature, and to maintain the desired brew temperature as the water flows continuously through the flow path;
      vi. a pressure sensor positioned in the flow path operable to sense a pressure of the water in the flow path; and
      vii. a temperature sensor positioned in or near the flow path operable to sense a temperature of the water along the portion of the flow path where the heater is arranged; and
         wherein one or more of the spray valve, heater, pressure sensor, and temperature sensor are electrically connected to the controller;
   b. fluidly connecting the tankless beverage brewing apparatus to the local water supply via the inlet of the fluid path;
   c. reducing the water pressure from the local water supply via the pressure reducer positioned in the fluid path;
   d. activating the tankless beverage brewing apparatus and initiating a beverage brewing cycle for a desired beverage via a user interface;
   e. heating water in the flow path to a desired brew temperature of the desired beverage via the heater controlled by the controller, wherein the controller receives feedback from the temperature sensor connected thereto;
   f. controlling water flow rate from the water inlet of the flow path and out of a water delivery mechanism via the controller based on the desired beverage, wherein the controller is electrically connected to the spray valve positioned in the flow path to allow water to flow through the flow path, and wherein the controller is also electrically connected to the pressure sensor positioned in the flow path to adjust flow rate; and
   g. deactivating the heater and closing the spray valve at an end of a predetermined brew time of the desired beverage.

2. The method of claim 1 wherein the controller is operable for dynamically varying at least one of water temperature, flow rate, and quantity of water through the one or more water delivery mechanisms, by controlling at least one of the spray valve and heater.

3. The method of claim 2 wherein the controller dynamically varies one or more of water temperature and flow rate based on feedback from one or more of the temperature sensor and pressure sensor.

4. The method of claim 1 wherein the heater is controllable by the controller.

5. The method of claim 2 wherein the one or more water delivery mechanisms comprises at least one of a spray head and a spigot.

6. The method of claim 2 wherein the one or more water delivery mechanisms is electrically connected to the controller.

7. The method of claim 1 wherein the flow path further comprises an inlet line connected at the inlet to the local water supply at one end and coupled to an inlet of the pressure reducer at the other end; a main supply line coupled to an outlet of the pressure reducer at one end and coupled to an inlet of the spray valve at the other end; an outlet line coupled to an outlet of the spray valve at one end and coupled to an inlet of the one or more water delivery mechanisms at the other end.

8. The method of claim 1 wherein the pressure sensor is positioned in the flow path at a point between the pressure reducer and the one or more delivery mechanisms.

9. The method of claim 1 wherein the pressure sensor is positioned in the flow path at a point between the flow path inlet and the pressure reducer.

10. The method of claim 1 wherein the spray valve is at least one of electrically and manually controlled.

11. The method of claim 1 wherein the heater comprises a flow through on-demand heater.

12. The method of claim 1 further comprising a user interface electrically connected to the controller.

13. The method of claim 12 wherein the user interface comprises at least one of a display and user inputs.

14. The method of claim 13 wherein the user inputs comprise at least one of buttons or a touchscreen.

15. The method of claim 13 wherein the user via the user interface can at least one of turn the apparatus off and on, select a type of beverage to be brewed, select the quantity of beverage to be brewed, enter a brew temperature, initiate a brewing, suspend a brewing, program the apparatus, and check health and/or status information of the apparatus.

16. The method of claim 1 wherein the controller comprises at least one of a standard controller or a microprocessor device capable of executing program instructions.

17. The method of claim 16 wherein a beverage profiles file is programmed into the controller, wherein the beverage profiles file comprises at least one of brew flow rates and brew temperatures for different types and quantities of brew beverages.

18. The method of claim 1 further comprising a communications interface connected to the controller.

19. The method of claim 18 wherein the communications interface comprises at least one of a wired communications interface and wireless communications interface.

20. The method of claim 18 wherein the communications interface is operable for at least one of local and remote access to the controller, wherein the communications interface can be used to at least one of install software updates into the controller, update beverage profiles file, and monitor the health and/or status of the apparatus.

21. The method of claim 2 wherein the controller controls the heater using pulse-width modulation (PWM) to maintain a desired brew temperature.

22. The method of claim 2 wherein the controller can control the spray valve to create an intermittent water flow out of the one or more water delivery mechanisms.

23. The method of claim 2 wherein the controller dynamically controls the spray valve to vary length and number of pulses of water from the one or more water delivery mechanisms during a brewing cycle.

24. The method of claim 2 wherein at least one of the flow rate and temperature can be controlled independently for each of the one or more water delivery mechanisms.

25. The method of claim 1 wherein the flow path comprises a branch to form a second flow path connected to a second water delivery mechanism at its second end.

26. The method of claim 25 further comprising at least one of a second spray valve, second pressure reducer, second pressure sensor, second temperature sensor, and second heater, wherein the at least one of the second spray valve, second pressure reducer, second pressure sensor, and second temperature sensor are positioned in the second flow path and the second heater is positioned along a portion of the second flow path and thermally coupled thereto.

27. The method of claim 26 wherein at least one of the second spray valve, second pressure reducer, second pressure sensor, second temperature sensor, and second heater can be monitored and/or controlled independently, and therefore the flow rate and/or water temperature from the second water delivery mechanisms can be dynamically controlled by the controller independently.

* * * * *